Sept. 29, 1959

J. A. LIGHT, SR 2,906,080

LAWN EDGING ATTACHMENT FOR TRACTORS

Filed Feb. 12, 1957

INVENTOR.
JAMES A. LIGHT, Sr.
BY
McMurray, Berman + Davidson
ATTORNEYS

Sept. 29, 1959  J. A. LIGHT, SR  2,906,080
LAWN EDGING ATTACHMENT FOR TRACTORS
Filed Feb. 12, 1957  3 Sheets-Sheet 2

INVENTOR.
JAMES A. LIGHT, Sr.
BY
McMorrow, Berman & Davidson
ATTORNEYS

Sept. 29, 1959  J. A. LIGHT, SR  2,906,080
LAWN EDGING ATTACHMENT FOR TRACTORS
Filed Feb. 12, 1957  3 Sheets-Sheet 3

INVENTOR.
JAMES A. LIGHT, Sr.
BY
McMurry, Berman & Davidson
ATTORNEYS

United States Patent Office 2,906,080
Patented Sept. 29, 1959

2,906,080

LAWN EDGING ATTACHMENT FOR TRACTORS

James A. Light, Sr., Montgomery, Ala.

Application February 12, 1957, Serial No. 639,717

6 Claims. (Cl. 56—25.4)

This invention relates to an improved lawn edging attachment for tractors, for use along kerfs, sidewalks, driveways, roads, and the like.

A primary object of the invention is to provide more practical, more efficient and versatile attachment of this kind which involves a vertical plane horizontal axis cutter disc to be run along the edge of a lawn for edging the same, and a driven horizontal vertical axis rotary brush operating at one side of the cutter disc for clearing away cut edging including earth and grass cut by the cutter disc away from the edge of the lawn, and, in the case of edging a lawn adjacent to the curb of a road or the like, cleaning the curb and the surface of the road adjacent to the curb, the cutter disc being angularly and laterally adjustable relative to a curb to form a trench therealong, and the brush being angularly adjustable relative to the horizontal and toward and away from the cutter disc to vary its cooperation with the disc and the curb or other ground surface.

Another object of the invention is to provide an edging attachment of the character indicated which is readily installed on a tractor and easily used, and is highly satisfactory for the purpose intended.

These together with other objects and advantages will become apparent from the following description taken in conjunction with the accompanying drawings in which.

Figure 1:
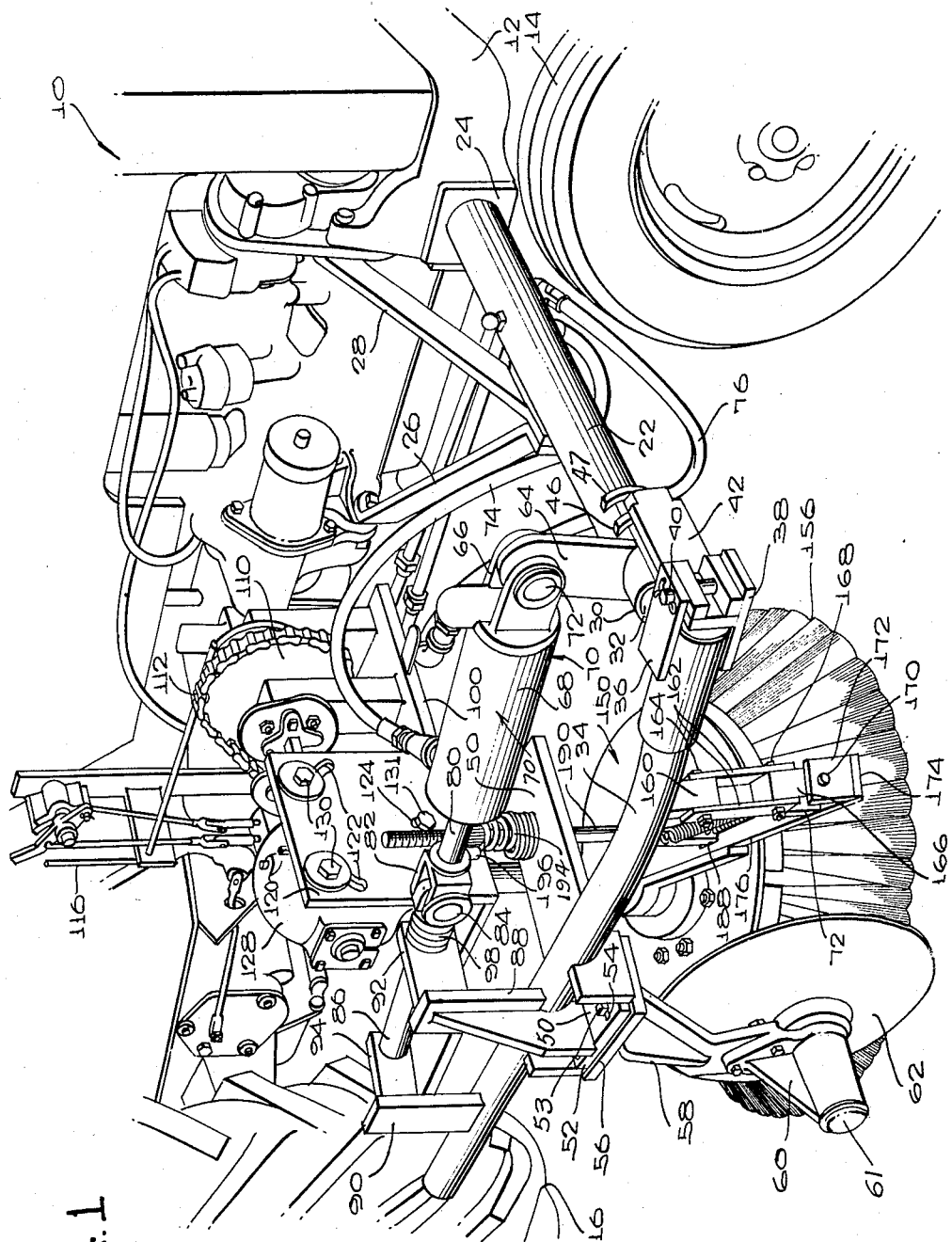
Figure 1 is a fragmentary perspective view of a tractor having an edging attachment of the present invention mounted thereon.

Referring to the drawings in detail, indicated generally at 10 is a conventional three-wheeled tractor having a chassis 12 and front and rear ground-engaging wheels 14 and 16, respectively. As most clearly shown in Figure 2, the tractor 10 has extending laterally therefrom at one side thereof a power take-off shaft 17 having thereon a drive sprocket 18 which is utilized to drive the brush assembly of the edging attachment of the present attachment as hereinafter described.

Figure 5:
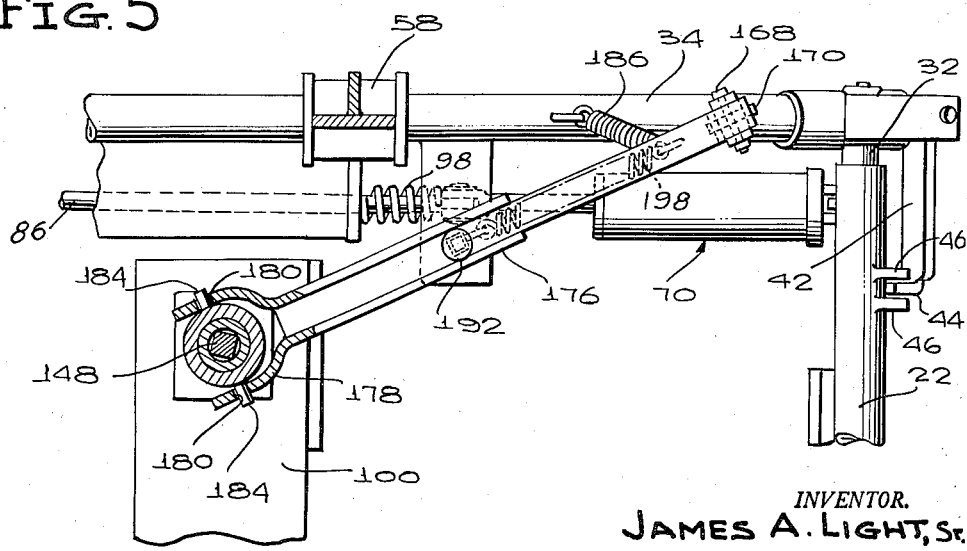
Figure 5 is an enlarged fragmentary horizontal section taken substantially on the plane of line 5—5 of Figure 2.

The illustrated attachment, generally designated 20, comprises a horizontal support member or tubular arm 22 having on its laterally inward end a mounting plate 24 suitably secured to the adjacent side of the chassis 12 of the tractor. The support member or arm 22 may be braced by angularly related brace elements 26 and 28. Journaled in the arm 22 and extending out of its outer end 30 is a shaft 32. Extending rearwardly from the outer end of the shaft 32 is a horizontal longitudinal rod 34 having extending forwardly therefrom a pair of vertically spaced plates 36 and 38 traversed by a vertical pin 40 which traverses also the laterally outward end of a lever 42. The lever 42 has on its laterally inward end a rearwardly directed leg 44, Figure 5, extending toward the arm 22 and engaged between a pair of arcuate abutment ribs 46 and 47 on the arm 22 to prevent lateral movement of the rod 34 relative to the arm 22.

Figure 2:
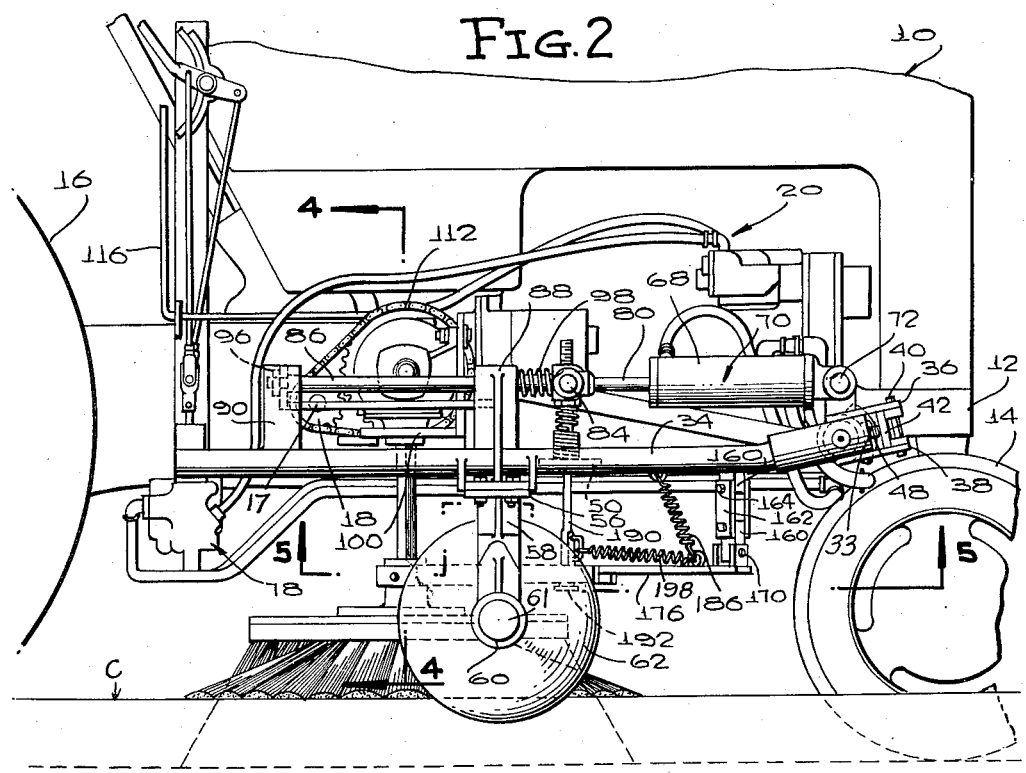
Figure 2 is a fragmentary side elevation of Figure 1 showing the tractor operating on the street or road pavement and the edging blade and brush adjusted to operate upon the edge of the lawn adjacent to a street or road curb.

Compressed between the forward end 33 of the rod 34 and the lever 42 is an expanding spring 48, Figure 2, which urges the lug 44 of the lever 42 against the forward side of the arm 22 between the abutment ribs 46 and 47. The rod 34 supports a cutter disc assembly of the attachment, and by positioning the lug 44 of the lever 42 between the ribs 46 and 47 or at the laterally inward side of the inner rib 47, the rod 34 can be laterally adjusted relative to the outer end 30 of the arm 22.

Figure 3:
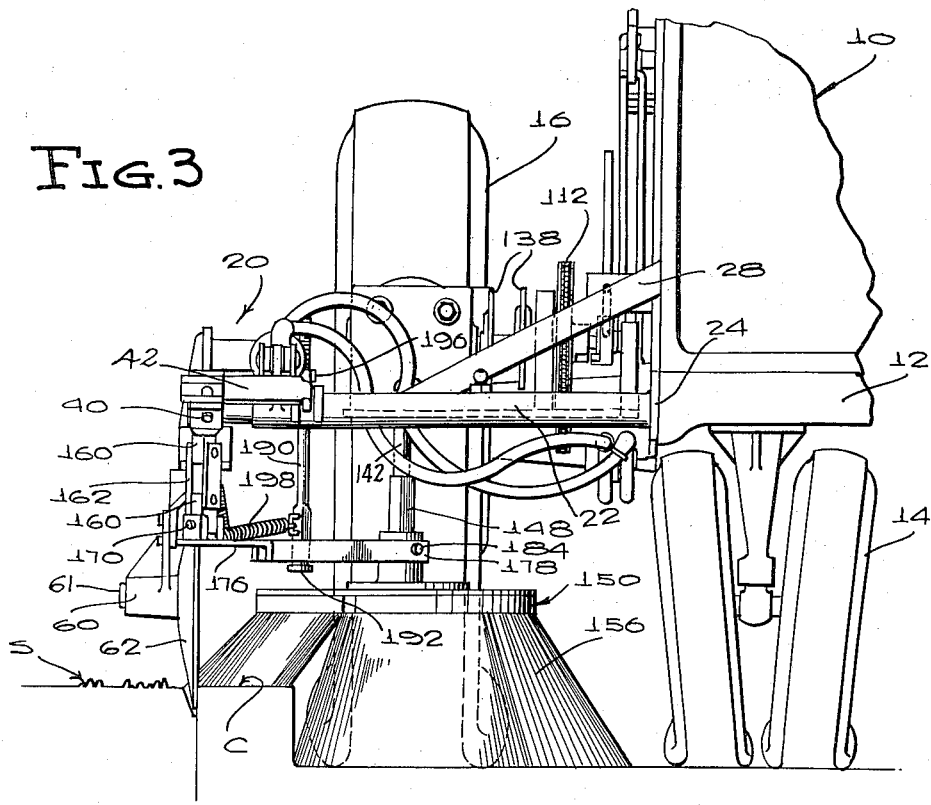
Figure 3 is a fragmentary front elevation of Figure 2.

The rod 34 has secured transversely of an intermediate portion thereof a horizontal plate 50 having a plurality of arcuate slots 54 therein through which extend bolts 53 for retaining against the under side of the plate 50 another plate 56 which can thereby be rotated horizontally to a slight degree. Depending from the plate 56 is a bracket 58 having on its lower end a horizontally disposed laterally inwardly opening bearing socket 60 having journaled therein a stub shaft or horizontal axis 61 of a vertically disposed cutter disc 62. The cutter disc 62 rotates when engaged with the sod S to be edged adjacent such as a curb C of a street or road, Figure 3, while the tractor 10 is in motion. By rotating the plate 56 about a vertical axis by virtue of the bolts 53 and the arcuate slots 54, the width of the cut of the disc 62 can be adjusted to a slight degree so that a trench or ditch is produced adjacent the curb C. It is to be noted that the bracket 58 carrying the horizontal axis or stub shaft 61 and disc 60, plate 56 and bolts 53 passing through arcuate slots 54 in the plate 50 and through an opening in the plate 56 constitute means operatively connected to the disc 62 for shifting the vertical plane of the disc about the horizontal axis outwardly and inwardly with respect to the curb C.

The lateral tubular arm 22 has thereon an upstanding bracket 64 which is straddled by a bifurcated end portion 66 of a hydraulic or pneumatic cylinder 68 of an extensible fluid motor, indicated generally at 70. The bifurcated end portion 66 is pivoted to the bracket 64 by means of a transverse shaft 72. The fluid motor 70 is of the two-way type and has communicating therewith fluid pressure conduits 74 and 76 which are operatively connected to a suitable central valve, indicated generally at 78, Figure 2, to be operated by the operator of the tractor. The cylinder 68 has extending rearwardly therefrom a piston rod 80 having on its rear end a clevis 82 traversed by a pivot pin 84, Figure 1, extending through the forward end of a longitudinal rod 86. The rod 34 has on its intermediate portion thereof upstanding front and rear brackets 88 and 90, which have extending laterally inwardly therefrom toward the rod 86, arms 92 and 94 respectively. The rod 86 is slidably supported through the arms 92 and 94, and the rear end of the rod 86 is threaded and has thereon a retaining nut 96, shown in dotted lines in Figure 2, which is engaged with the rear side of the arm 94. Compressed between the clevis 82 of the piston rod 80 and the front arm 92 is an expanding spring 98. By operating the fluid motor 70 so as to extend or retract the piston rod 80, the rod 34 can be vertically pivoted on the axis of the shaft 32 for adjusting the height of the cutter disc. The spring 98 serves to absorb shocks to the structure when stones, metal, and other obstructions are struck by the cutter disc 62.

Figure 4:
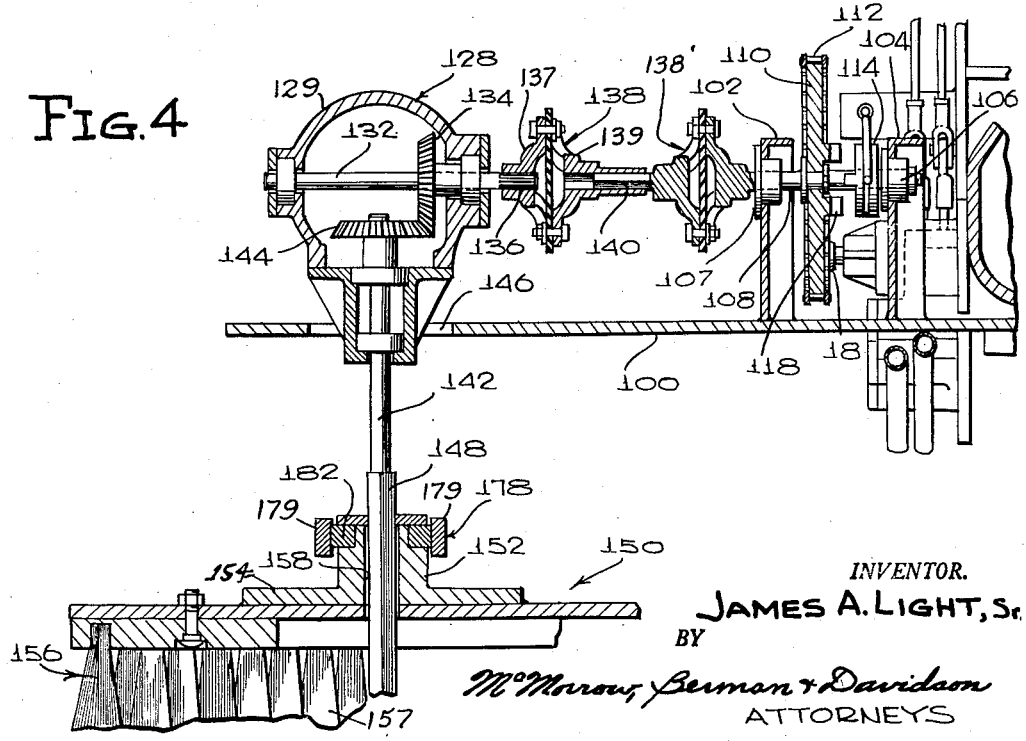
Figure 4 is an enlarged fragmentary vertical transverse section taken substantially on the plane of line 4—4 of Figure 2.

The tractor chassis 12 has fixed thereon and extending laterally outwardly therefrom, at a point between the brackets 88 and 90, a horizontal support plate 100 which has thereon outer and inner upstanding brackets 102 and 104, Figure 4, having therein journal bearings 106 and 107, respectively, having extending therethrough a shaft 108 having rotatably mounted thereon a sprocket 110 in longitudinal alignment with drive sprocket 18 of the power take-off shaft 17, and a sprocket chain 112 is trained over the sprockets. The shaft 108 has a polygonal cross section and has non-rotatably but slidably mounted thereon a clutch member 114 adapted to be moved toward and away from the sprocket 110 by a manual clutch lever 116, Figure 2, said clutch member 114 being engageable with a cooperating clutch portion 118 on the sprocket 110, so that when the clutch member 114 is engaged with the portion 118 of the sprocket 110 the shaft 108 is rotated.

The support plate 100 has extending vertically from its forward edge a support plate 120, Figure 1, having near its upper edge a pair of upwardly converging arcuate slots 122 which are concentric to a slot 124. A transmission 128 is mounted on the rear side of the support plate 120 by bolts 130 traversing the slots 122 and a bolt 131 traversing the slot 124, so that the transmission 128 can be adjustably rotated on an axis defined by the bolt 131. The transmission 128, Figure 4, has journaled therethrough a transverse shaft 132 having secured thereon a bevel gear 134, disposed within the transmission housing 129 the shaft 132 extends laterally inwardly from the housing 129 and is splined at 136 in one section 137 of a flexible coupling, indicated generally at 138. The flexible coupling 138 has another section 139 which is slidably and non-rotatably engaged on a polygonal shaft 140 which is connected to a second flexible coupling 138' which is operatively connected to the shaft 108. Journaled in and depending from the transmission housing 129 is a vertical brush support shaft or axis 142 having suitably keyed on its upper end within the housing 129 a bevel gear 144 in mesh with the bevel gear 134 on shaft 132. The lower part of the housing 129 depends through an opening 146 in the support plate 100 which is sufficiently large to enable vertical adjustment of the transmission 128 relative to the support plate 100. The brush support shaft 142 has a polygonal lower end portion 148 on which is secured a brush assembly, indicated generally at 150. The brush assembly 150 comprises a hub 152 including a horizontal supporting flange portion 154 having suitably mounted on its under side an annular brush 156 having bristles 157 of steel, for example. The hub 152 incorporates a vertical bore 158 slidably and non-rotatably receiving the polygonal portion 148 of the brush support shaft 142, so that upward movement of the brush assembly 150 is permitted in the event obstructions are struck thereby, so as to prevent damage to the attachment during operation thereof. The vertical pivotal adjustability of the transmission 128 relative to the support plate 120 enables canting of the brush assembly 150 relative to the vertical plane of the cutter disc 62, in order to more efficiently perform a lawn edging operation.

It is to be noted that the vertical brush support shaft 142 or vertical axis of the brush assembly 150 is to the rear of the horizontal axis or stub shaft 61 of the disc 62. Also, the bracket 52 carrying the stub shaft 61 or horizontal axis of the disc 62, plate 56 and bolts 53 passing through arcuate slots 54 and plate 50 and through plate 56 constitute means operatively connected to the disc 62 for shifting the vertical plane of the disc 62 about its horizontal axis or stub shaft 61 outwardly and inwardly of the bristles 156 of the brush assembly 150.

As above described, the disc 62 and the brush assembly 150 are shiftable as a unit toward and away from a ground surface. The means wihch is operatively connected to the disc 62 and the brush assembly 150 for effecting such shifting comprises the arm 22, horizontal rod 34, shaft 32, upstanding bracket 64 carried by the arm 22, the cylinder 68 of the hydraulic motor 70 connected to the bracket 64, and piston rod 80 and the associated rod 86 and rear bracket 90 on the rod 34.

Depending from the support rod 34 forwardly of the cutter disc 62 and the brush assembly 150, is a bracket 160 having on opposite sides thereof depending bars 162 retained thereon by means of a transverse pivot pin 164. The lower ends of the bars 162 engage opposite sides of a block 166 and are pivoted thereto by means of a pivot pin 168. The lower end of the block 166 has extending therethrough at substantially 90 degrees to the pivot pin 168, a pivot pin 170 which traverses an upstanding clevis 172 on the forward end 174 of the horizontal rearwardly extending counterbalancing arm 176, which has on its rear end a clevis 178, Figure 5, whose arms 79 have aligned apertures 180 therethrough. The portion 148 of the shaft 142 of the brush assembly 150 has circumposed thereon a ring 182 bearing upon the upper end of the hub 152, having thereon diametrically opposed trunnions 184 journaled in the aligned apertures 180. As seen in Figure 2, the support rod 34 has fixedly secured on the under side thereof the upper end of a contractile spring 186, whose other end is secured to the arm 176, to sustain some of the weight of the brush assembly 150, and to absorb some of the shocks whenever the brush assembly strikes an obstruction.

In order to vertically adjust the brush assembly 150 relative to the cutter disc 62, the arm 176 has intermediate its ends an opening 188, see Figure 1, which has depending therethrough a vertical rod 190 having on its lower end an enlarged head 192. The upper end of the rod 190 extends through the support plate 50 and has circumposed thereon an expanding spring 194 which is compressed between the upper surface of the plate 50 and the retaining nut 196 on the upper end of the rod 190. By rotating the nut 196 the arm 176 can be raised or lowered to elevate or depress the brush assembly relative to the cutter disc 62. The pivot pin 170 permits the above mentioned canting of the brush 156 relative to the vertical plane of the cutter disc 62. Stretched between the rod 190 above the arm 176 and the forward part of the arm 176 is a contractile spring 198 which serves to yieldably resist excessive vertical movement of the rod 190 relative to the arm 176.

It will be noted that after the cutter disc 62 and the brush assembly 150 have been disposed in adjusted positions they can be together elevated and depressed by means of the fluid motor 70 relative to the ground.

What is claimed as new is as follows:

1. In a lawn edging attachment, a cutter disc arranged in a substantially vertical plane and freely rotatable about a horizontal supporting flange portion and steel bristles extending downwardly from said flange portion, said brush assembly being positioned on one side of said disc with the bristles on said one side thereof extending into engagement with said disc, whereby said disc cuts a trench along a curb and said brush assembly will remove the cut edging and throw said edging away from said disc.

2. In a lawn edging attachment, a cutter disc arranged in a substantially vertical plane and freely rotatable about a horizontal axis, and a rotatable brush assembly including a substantially horizontal supporting flange portion and steel bristles extending downwardly from said flange portion, said brush assembly being positioned on one side of said disc with its axis of rotation to the rear of that of said disc and the bristles adjacent said one side thereof extending into engagement with said disc, whereby said disc cuts a trench along a curb and said brush assembly will remove the cut edging and throw said edging away from said disc.

3. In a lawn edging attachment, a cutter disc arranged in a substantially vertical plane and freely rotatable about a horizontal axis, a rotatable brush assembly including a substantially horizontal supporting flange portion and steel bristles extending downwardly from said flange portion, said brush assembly being positioned on one side of said disc with the bristles on said one side thereof extending into engagement with said disc, whereby said disc cuts a trench along a curb and said brush assembly will remove the cut edging and throw said edging away from said disc, and means operatively connected to said disc for shifting the vertical axis of said disc about said horizontal axis outwardly and inwardly of said bristles.

4. In a lawn edging attachment, a cutter disc arranged in a substantially vertical plane and freely rotatable about a horizontal axis, a rotatable brush assembly including a substantially horizontal supporting flange portion and steel bristles extending downwardly from said flange portion, said brush assembly being positioned on one side of said disc with the bristles on said one side thereof extending into engagement with said disc, whereby said disc cuts a trench along a curb and said brush assembly will remove the cut edging and throw said edging away from said disc, and means operatively connected to said brush assembly for canting the brush assembly relative to the vertical plane of said disc.

5. In a lawn edging attachment, a cutter disc arranged in a substantially vertical plane and freely rotatable about a horizontal axis, a rotatable brush assembly including a substantially horizontal supporting flange portion and steel bristles extending downwardly from said flange portion, said brush assembly being positioned on one side of said disc with the bristles on said one side thereof extending into engagement with said disc, whereby said disc cuts a trench along a curb and said brush assembly will remove the cut edging and throw said edging away from said disc, and means operatively connected to said brush assembly for raising and lowering said bristles relative to said disc.

6. In a lawn edging attachment, a cutter disc arranged in a substantially vertical plane and freely rotatable about a horizontal axis, a rotatable brush assembly including a substantially horizontal supporting flange portion and steel bristles extending downwardly from said flange portion, said brush assembly being positioned on one side of said disc with the bristles on said one side thereof extending into engagement with said disc, whereby said disc cuts a trench along a curb and said brush assembly will remove the cut edging and throw said edging away from said disc, and means operatively connected to said disc and brush assembly for shifting said disc and brush assembly as a unit toward and away from a ground surface.

References Cited in the file of this patent

UNITED STATES PATENTS

| Number | Name | Date |
|---|---|---|
| 1,291,295 | Wagner et al. | Jan. 14, 1919 |
| 1,480,270 | Kopitke | Jan. 8, 1924 |
| 1,890,811 | Gast | Dec. 13, 1932 |
| 1,967,651 | Anderson | July 24, 1934 |
| 2,043,148 | Blondeau | June 2, 1936 |
| 2,062,711 | Hansen | Dec. 1, 1936 |
| 2,064,480 | Lock et al. | Dec. 15, 1936 |
| 2,132,465 | Gast | Oct. 11, 1938 |
| 2,187,833 | Lock et al. | Jan. 23, 1940 |
| 2,630,052 | Jory | Mar. 3, 1953 |
| 2,655,678 | Keogh | Oct. 20, 1953 |
| 2,707,361 | Thomas | May 3, 1955 |
| 2,718,836 | Pertics et al. | Sept. 27, 1955 |
| 2,721,432 | Machovec | Oct. 25, 1955 |
| 2,725,584 | Dempster et al. | Dec. 6, 1955 |
| 2,763,977 | Spencer et al. | Sept. 25, 1956 |
| 2,771,730 | True | Nov. 27, 1956 |
| 2,792,770 | Ober | May 21, 1957 |